US011678251B2

United States Patent
Clegg et al.

(10) Patent No.: US 11,678,251 B2
(45) Date of Patent: Jun. 13, 2023

(54) REVERSE GEOFENCE FEATURE IN AN AUTOMATED FREQUENCY COORDINATION SYSTEM

(71) Applicant: Google LLC, Mountain View, CA (US)

(72) Inventors: Andrew Clegg, Mountain View, CA (US); Nihar Jindal, Palo Alto, CA (US); Raymond Hayes, Mountain View, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 17/305,160

(22) Filed: Jun. 30, 2021

(65) Prior Publication Data

US 2023/0007567 A1 Jan. 5, 2023

(51) Int. Cl.
*H04W 24/00* (2009.01)
*H04W 48/04* (2009.01)
*H04W 4/021* (2018.01)

(52) U.S. Cl.
CPC .......... *H04W 48/04* (2013.01); *H04W 4/021* (2013.01)

(58) Field of Classification Search
CPC ............... H04W 48/04; H04W 4/021
See application file for complete search history.

(56) References Cited

U.S. PATENT DOCUMENTS

2022/0224496 A1* 7/2022 Kalenahalli .......... H04L 5/0069

* cited by examiner

*Primary Examiner* — Justin Y Lee
(74) *Attorney, Agent, or Firm* — Honigman LLP; Brett A. Krueger

(57) ABSTRACT

A method for generating a geofence includes receiving, at an automated frequency coordination (AFC) system, a geofence request from an AFC device where the geofence request requests to use a licensed radio frequency band and includes one or more operating parameters for the AFC device. The method also includes determining, by the AFC system, whether any of the one or more operating parameters interfere with any licensed devices on the licensed radio frequency band. When none of the one or more operating parameters interfere with any of the licensed devices on the licensed frequency band, the method further includes generating, by the AFC system, based on the one or more operating parameters, a geofence defining an operating boundary for the AFC device to communicate within. The method also includes communicating, from the AFC system to the AFC device, a response to the geofence request where the response includes the geofence.

20 Claims, 7 Drawing Sheets

REVERSE GEOFENCE FEATURE IN AN AUTOMATED FREQUENCY COORDINATION SYSTEM

TECHNICAL FIELD

This disclosure relates to a reverse geofence feature in an automated frequency coordination system.

BACKGROUND

Today many consumer devices are capable of providing wireless communication or functioning in some manner as a communication access point or hotspot. Because of this functionality and other reasons, radio frequency bands allocated to wireless or broadband communication have become increasingly congested. Yet even as the regulatory bodies expand the radio frequency bands accessible to consumer devices, the radio frequency bands that are allocated by these regulatory bodies often include licensed systems or devices that operate on these frequency bands based on a licensing arrangement. When unlicensed devices (e.g., consumer devices that do not receive regulatory licenses) combine with licensed devices on the same radio frequency bands, there is the potential for interference. Since this interference may be at the detriment to the licensed user, there is a need for an approach that minimizes or reduces the potential of this interference to occur. This is especially true when many consumer devices are mobile (e.g., mobile phones) and may move from one area that did not interfere with a licensed system to another area that does interfere with a licensed system.

SUMMARY

One aspect of the disclosure provides a computer-implemented method for generating a geofence for an automated frequency coordination (AFC) device using an AFC system. The method when executed by data processing hardware causes the data processing hardware to perform operations. The operations include receiving, at an AFC system, a geofence request from an AFC device, the geofence request requesting to use a licensed radio frequency band and including one or more operating parameters for the AFC device. The operations also include determining, by the AFC system, whether any of the one or more operating parameters interfere with any licensed devices on the licensed radio frequency band. When none of the one or more operating parameters interfere with any of the licensed devices on the licensed frequency band, the operations further include generating, by the AFC system, based on the one or more operating parameters, a geofence defining an operating boundary for the AFC device to operate within. The operations also include communicating, from the AFC system to the AFC device, a response to the geofence request where the response includes the geofence generated by the AFC system.

Another aspect of the disclosure provides a system for generating a geofence for an automated frequency coordination (AFC) device using an AFC system. The system includes data processing hardware and memory hardware. The memory hardware is in communication with the data processing hardware and stores instructions that, when executed on the data processing hardware, perform operations. The operations include receiving, at an AFC system, a geofence request from an AFC device, the geofence request requesting to use a licensed radio frequency band and including one or more operating parameters for the AFC device. The operations also include determining, by the AFC system, whether any of the one or more operating parameters interfere with any licensed devices on the licensed radio frequency band. When none of the one or more operating parameters interfere with any of the licensed devices on the licensed frequency band, the operations further include generating, by the AFC system, based on the one or more operating parameters, a geofence defining an operating boundary for the AFC device to operate within. The operations also include communicating, from the AFC system to the AFC device, a response to the geofence request where the response includes the geofence generated by the AFC system.

Implementations of the method or the system may include one or more of the following optional features. In some implementations, the operations further include identifying, by the AFC system, a locational uncertainty for the AFC device and the operation of generating the geofence defining the operating boundary for the AFC device to operate is further based on the location uncertainty of the AFC device. In some examples, the operations also include identifying, from the one or more operating parameters, a location of the AFC device and determining interference locations in an area adjacent to the location identified for the AFC device where each interference location corresponds to a respective location where the one or more operating parameters interfere with an operation of the licensed device on the licensed radio frequency band. Here, generating, the geofence defining the operating boundary for the AFC device to operate is further based on excluding the interference locations from the operating boundary. The one or more operating parameters may include a location for the AFC device. The one or more operating parameters may include a longitude, a latitude, and a height above ground level for the AFC device. Here, the operating boundary of the geofence may correspond to a volumetric space for the AFC device to operate within based on the one or more operating parameters. The one or more operating parameters may include a minimum operating power for the AFC device. In some implementations, the one or more operating parameters include global positioning system (GPS) information for the AFC device. In some examples, the response further includes an operating power constraint for the AFC device where the operating power constraint indicates a threshold operating power for the AFC device to operate at within the geofence generated by the AFC system. The AFC device may be a device without a license to operate at the licensed radio frequency band or a device that is licensed to operate at the licensed radio frequency band (e.g., a mobile licensed device). In some configurations, the AFC device includes a mobile device.

In some configurations of either the method or the system, the response further includes a plurality of recommended geofences. Here, the plurality of recommended geofences includes the geofence and a first range of frequencies in the licensed radio frequency band for the AFC device to operate within the geofence and a second geofence and a second range of frequencies in the licensed radio frequency band for the AFC device to operate within the second geofence. The second geofence has a different respective operating boundary than the operating boundary of the geofence.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
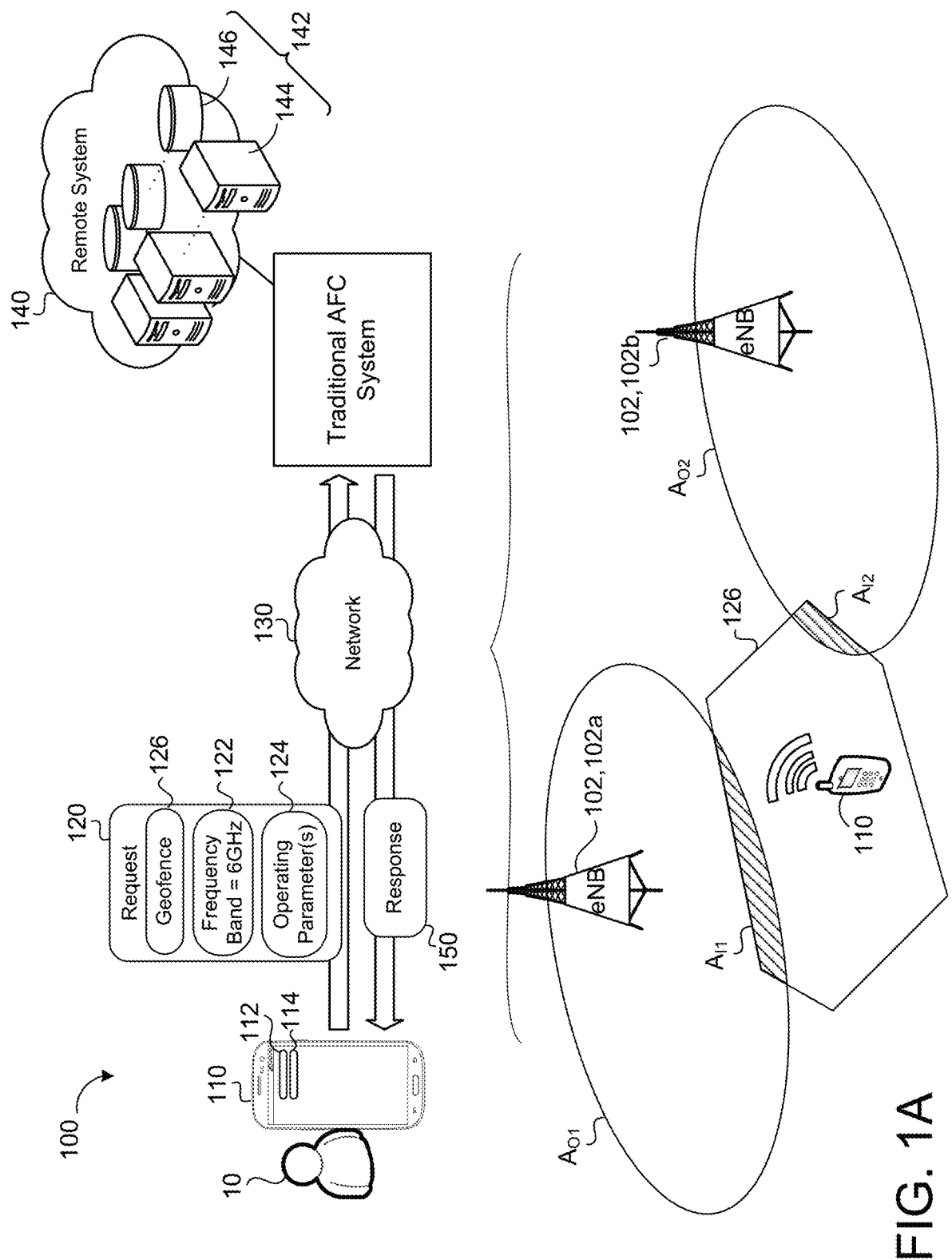
FIGS. 1A and 1B are schematic views of example communication environments for an Automatic Frequency Coordination (AFC) system.

Devices capable of wireless communications have significantly increased in recent years due, in part, to the age of the smart device. Many households today have numerous devices capable of wireless connectivity and often these devices are mobile in nature. To wirelessly communicate, user devices or consumer devices use a designated portion of the radio frequency spectrum. The radio frequency spectrum refers to a continuous range of radio wave frequencies that have been divided into bands by one or more communication regulating bodies. A radio band refers to some contiguous section of radio spectrum frequencies in which channels are usually designated for a particular purpose. For instance, device operating services such as broadcasting, mobile radio, or navigation are allocated non-overlapping ranges of frequencies (i.e., frequency bands) to prevent interference and to promote the efficient use of the radio spectrum.

With the use of consumer devices continuously expanding over the last few decades, the frequency bands allocated to such devices has also been expanding. Generally speaking, user equipment (e.g., wireless access points), thought of colloquially as user devices or consumer devices, are unlicensed devices capable of wireless communication using radio waves. Here, "unlicensed" refers to the fact that this category of equipment (i.e., user equipment) does not require a license from a radio frequency regulatory body such as the Federal Communications Commission (FCC) or a frequency assignment from the National Telecommunications and Information Administration (NTIA). Initially, unlicensed devices, which were typically low-power devices, such as mobile phones, Bluetooth, wireless networking (e.g., Wi-Fi), keyless entry, garage door openers, etc., were allocated to operate at an ultra-high frequency (UHF) on a microwave frequency band (also known as the S band). More particularly, Wi-Fi networks following standards like IEEE 802.11b, 802.11g, and 802.11n used the 2.4 GHz section of the S band. Depending on the country, this 2.4 GHz band includes around 11 channels. At the turn of the $21^{st}$ century, and ushered further by the IEEE 802.11n standard, wireless communication for user equipment expanded to the use of the 5 GHz band (or ultra-high frequency (UHF) band). Even with the 5 GHz band offering an additional 500 MHz of spectrum to Wi-Fi's capability, the popularity of technology having wireless connectivity has led to both the 2.4 GHz band and the 5 GHz band to have a significant amount of congestion today.

Recently, the FCC approved the use of the 6 GHz frequency band for wireless communication (e.g., Wi-Fi or similar broadband technology) with unlicensed devices on the condition that unlicensed devices do not interfere with devices (also referred to as licensed devices) that have received licenses to use the 6 GHz frequency band. The 6 GHz frequency band is a spectrum of radio frequencies ranging from 5.925 GHz to 7.125 GHz (or 1200 MHz of spectrum). This spectrum addition to wireless capability is an expansion that adds upwards of one hundred channels for unlicensed devices to utilize.

The caveat to the 6 GHz spectrum expansion is that unlicensed devices do not interfere with incumbent licensed devices or systems. This may be particularly important when these licensed uses in the 6 GHz band correspond to uses such as communication links for utility and public safety networks, Fixed Satellite Services (FSS), and backhaul connections to provide data to and from cell sites for carrier providers (i.e., mobile services). In order to ensure that interference does not occur between licensed devices and unlicensed devices, the FCC established a framework that allows unlicensed devices to operate in the 6 GHz band without causing interference by relying on two different methods. The first method is for indoor use and dictates that low-power unlicensed devices will be used indoors only. The rationale for this method is that a building's structure will attenuate signals from the low power unlicensed devices during indoor use such that the amount of radio energy imparted on outdoor licensed uses is too small to cause harmful interference. For example, a low power unlicensed device is a device that uses a maximum EIRP power spectral density of 5 dBm/MHz. The second method is for standard or high-power unlicensed devices (e.g., devices exceeding the maximum EIRP power spectral density of 5 dBm/MHz) being used indoors or outdoors and employs spectrum use coordination. In this method, the unlicensed device communicates operating parameters (e.g., a location, height, target power, radio frequency of operations, etc.) to a spectrum use coordination system called an Automated Frequency Coordination (AFC) system. Here, the AFC is configured as a system (e.g., a cloud-based system) with information regarding licensed systems/devices. That is, the AFC knows relevant operating parameters of licensed systems (e.g., location, height, antenna characteristics, frequency of operations, etc.). With the target operating parameters from the unlicensed device and the relevant operating parameters of licensed systems, the AFC system is able to determine whether the unlicensed device can operate with its target parameters without causing harmful interference to any of the licensed incumbent systems in a particular area. The AFC system then instructs the unlicensed device which frequency channels are available for the operation of the unlicensed device at the submitted operating parameters that will not interfere with licensed systems.

Industry standards have begun to develop based on the FCC's framework rules for preventing interference between unlicensed and licensed devices. One such standard created by the Wi-Fi Alliance (WFA) outlines protocols for a communication interface between an unlicensed device and the AFC system. Since the unlicensed device is communicating with the AFC system, the unlicensed device may also be referred to as an AFC device. In the standard set forth by the WFA, the AFC device reports its location to the AFC system along with the AFC device's target operating parameters. Based on these inputs, the AFC system basically responds with a binary decision that the AFC device may or may not operate at the target operating parameters at that particular AFC device location. In some examples, the response is a binary response for each potential channel (e.g., requested by the AFC device). In other words, the AFC device may send a request to the AFC system where the AFC device asks the AFC system whether it can operate at a particular set of operating parameters (e.g., a maximum power and a location) on any of four channels. Here, based on the set of operating parameters, the AFC system responds that the AFC device can operate on one of the four channels using the requested set of operating parameters.

In accordance with the WFA standard, when the AFC device requests to operate on the 6 GHz band, the AFC device reports its location (e.g., horizontal location and height) with 95% confidence to the AFC system in predominantly one of two manners. In the first manner, the AFC device reports its location to represent that the AFC device is static or installed/fixed at a single point. For instance, the AFC device is a wireless access point in a fixed location. In this static case, the AFC provides its location to the AFC device as an ellipse where the center of the ellipse is the fixed horizontal location (e.g., a longitude and latitude) of the AFC device and the radius of the ellipse represents the 95% confidence level for the location of that point (e.g., taking into account estimated statistical errors of a Global Positioning System measurement). Here, as part of the location, the AFC device also provides its height (e.g., as a height above ground level) and an uncertainty for that height value. In the second manner, the AFC device reports its location to represent that the AFC device is dynamic in nature (i.e., can be located at multiple points within a particular area or volume of space). In this dynamic situation, the AFC device reports its location to the AFC system as a polygon where the boundary set by the perimeter of the polygon dictates an area where the AFC device wishes to dynamically operate with 95% confidence. In other words, the polygon represents a target operating area with additional clearance such that the polygon represents the target operating area with 95% confidence (e.g., with additional clearance to account for possible statistical errors in the AFC device's location). Here, this polygon may also be referred to as a geofence since it sets a virtual boundary for the AFC device. Similar to the static situation, the AFC device also reports its height (e.g., a height above ground level) and an uncertainty measurement for that height value. In these examples, with the combination of the horizontal area, represented as either an ellipse or a polygon, and the height, the AFC device is providing a volumetric location to the AFC system.

Unfortunately, although the WFA standard provides for the AFC system to approve a dynamic operating area (e.g., represented by a geofence) requested by the AFC device, the AFC system's decision is rather inflexible with this standard. That is, it is quite possible for the AFC device to generate a geofence that, unbeknownst to the AFC device, interferes with a small portion of a licensed system. Here, a majority of the geofence may not interfere with licensed systems, but nonetheless since a small portion of the geofence area does interfere with a licensed system, the AFC system will deny the request for that particular geofence based on the interference. This is problematic because it burdens the AFC device with the task of creating a geofence when the AFC device does not inherently have any information regarding locations where licensed systems may interfere with a created geofence. In other words, the AFC device may prefer to simply shrink the size of a requested geofence polygon to prevent the small amount of potential interference instead of being completely denied operation.

To address some of these issues, the approach herein shifts the generation of the geofence to the AFC system. In other words, instead of the AFC device requesting that a particular geofence be approved, the AFC system is configured to generate the geofence itself for the AFC device based on requested operating parameters. This approach therefore leverages the built-in knowledge that the AFC system has with regard to the operation of licensed system(s) to generate a geofence for the AFC device. By enabling the AFC system to have the ability to create a geofence for the AFC device, the AFC system enables AFC devices to be used as mobile or dynamic access points in a more robust manner. That is, the AFC system can best leverage its knowledge of licensed systems to ensure that the AFC device can operate dynamically. Moreover, this approach can reduce the frequency of communication between the AFC device and the AFC system (e.g., the AFC device has to make less requests to get approval for a geofence) and may allow an AFC device that does not have a pre-established geographic range of operation to receive a robust geographic range for operation.

Figure 1B:
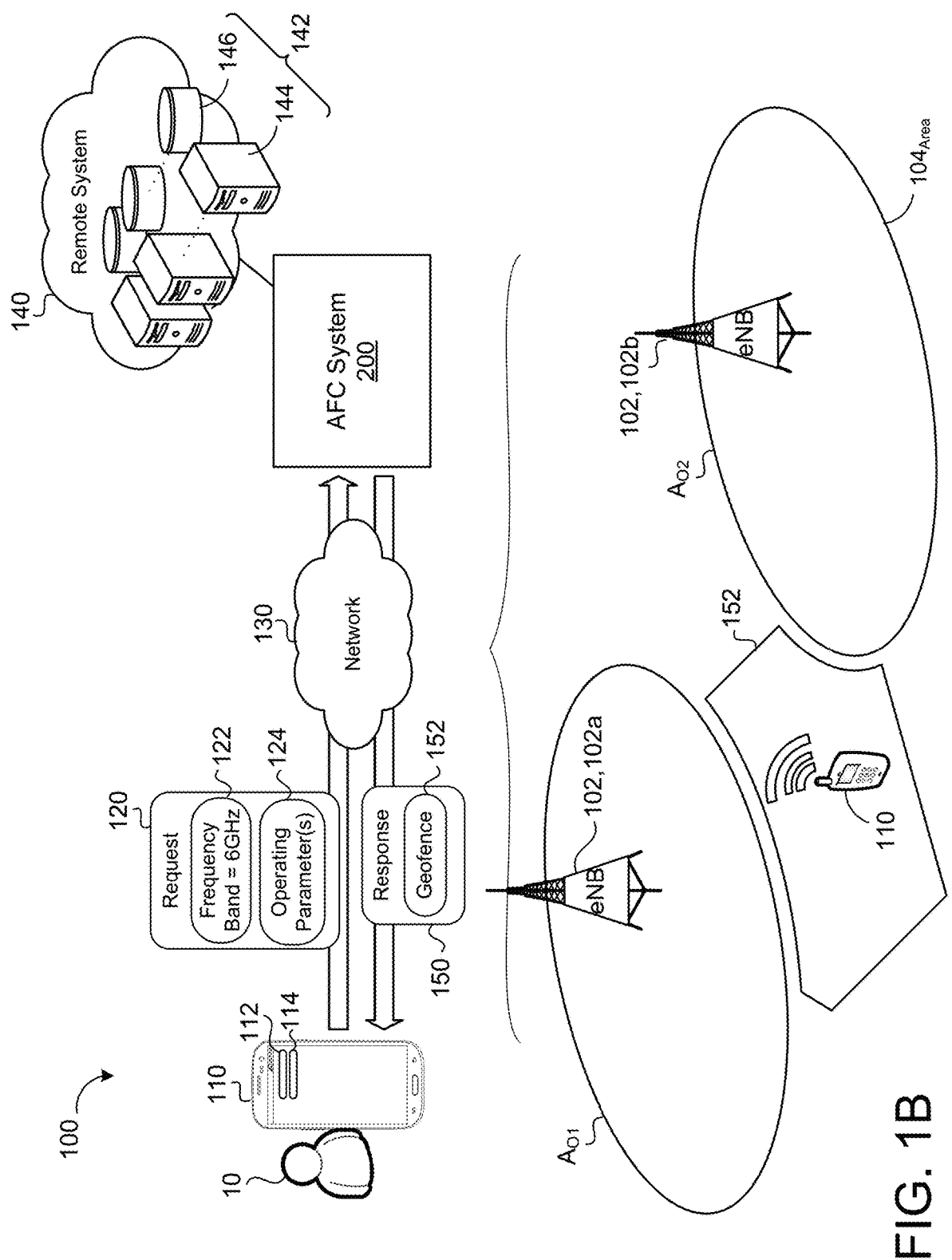

Referring to FIGS. 1A and 1B, an AFC device 110 associated with a user 10 generates a request 120 requesting to use a licensed radio frequency band 122. Here, the request 120 includes one or more operating parameters 124 for the AFC device 110. The operating parameters 124 provided in the request 120 allow an AFC system 200 to identify potential interference between the AFC device 110 and one or more licensed systems 102. Some examples of operating parameters 124 that may be provided to the AFC system 200 by the AFC device 110 include a target minimum power, the channel(s) on which the AFC device 110 can operate, a starting location (e.g., a horizontal location such as longitude and latitude), and a target operating height (or a range of target operating heights). As used herein, the target operating height refers to an operating height/altitude the AFC device 110 is above ground level. The AFC device 110 communicates the request 120 to the AFC system 200 via a network 130. In response to the request 120, the AFC system 200 generates a response 150 for the AFC device 110. The response 150 dictates whether the AFC device 110 can operate or not at the requested licensed radio frequency band 122 using the requested operating parameters 124 (or some variation thereof).

The AFC device 110 refers to any device that is both capable of wireless communication using a radio frequency band and capable of communication with the AFC system 200. In this respect, the AFC device 110 may be an unlicensed device or a licensed device. In the case of a licensed device, the AFC device 110 may be a mobile licensed device that, even though it has been approved to operate on a particular licensed radio frequency band, nonetheless ensures that its mobility does not interfere with the operations of other licensed systems on the particular licensed radio frequency band. Therefore, although some examples discussed herein are from the perspective of an unlicensed AFC device, the functionality of the AFC system 200 is also applicable to operating compliance between licensed systems 102 (e.g., compliance between a licensed AFC device 110 and other licensed systems 102).

In some examples, the AFC device 110 is a wireless access point (or simply access point (AP)) that corresponds to a networking component which allows other Wi-Fi enabled devices to connect to a network broadcasted by the AP. In some implementations, the AFC device 110 is a user device that is capable of acting as a hotspot. For example, the AFC device 110 is a mobile phone (e.g., a smartphone), tablet, laptop, or other smart device configured to provide hotspot functionality. The AFC device 110 may be configured with hotspot or AP functionality using particular hardware, firmware, software, or some combination thereof. The AFC device 110 includes data processing hardware 112 and memory hardware 114. The memory hardware 114 includes instructions that, when executed by the data processing hardware 112, perform operations related to automated frequency coordination and/or geofence implementation.

Referring to FIGS. 1A and 1B, the request 120 from the AFC device 110 dictates that the AFC device 110 is requesting to operate on the licensed radio frequency band 122 corresponding to the 6 GHz frequency band. Although this is the licensed radio frequency band 122 depicted throughout the examples, the techniques described herein can be deployed for other licensed frequency bands 122. In other words, if the FCC (or another regulating body) approves another licensed frequency band 122 for unlicensed device use (e.g., 8 GHz or 9 GHz), the geofence request process by the AFC device 110 and the geofence generation process by the AFC system 200 may be used to determine geofences for other licensed frequency bands 122. Since the AFC system 200 designates an area (i.e., a geofence 152) where the AFC device 110 can operate without interfering with licensed systems 102 on a particular licensed frequency band 122, this process is universally compatible with any licensed frequency band 122. Therefore, although the licensed frequency band 122 of 6 GHz is pertinent today based on recent regulatory approval, the processed described for the AFC device 110 and/or AFC system 200 may also translate to coordinating AFC device operation on other licensed frequency bands 122.

FIG. 1A is an example of a traditional AFC system where the request 120 includes a proposed geofence 126 configured by the AFC device 110. The proposed geofence 126 defines a target operating boundary that the AFC device 110 wishes to operate within. In other words, the AFC device 110 constructs a proposed geofence 126 based on where the AFC device 110 wants to dynamically operate and encloses this operating area with a polygon referred to as a geofence. In a traditional AFC system, the AFC system does not generate the geofence on its own accord, but rather either (i) approves the proposed geofence 126 because the proposed geofence 126 does not interfere with any licensed system 102 or (ii) denies approval for the proposed geofence 126 because the proposed geofence 126 interferes with one or more licensed systems 102. In this sense, the response 150 from a traditional AFC system is binary in nature—approval or not approval.

FIG. 1A illustrates two licensed systems 102, 102a—b where a first licensed system 102a corresponds to a first base station for a first mobile carrier and a second licensed system 102b that corresponds to a second base station for a second mobile carrier. In this example, the proposed geofence 126 from the AFC device 110 overlaps with a small amount of the operating area $A_O$ for each licensed system 102. In other words, with respect to the first licensed system 102a, the proposed geofence 126 overlaps with a first operating area $A_O$, $A_{O1}$ of the first licensed system 102a in a first interference area $A_I$, $A_{I1}$. Similarly, the proposed geofence 126 overlaps with a second operating area $A_O$, $A_{O2}$ of the second licensed system 102b in a second interference area $A_I$, $A_{I2}$. Even though these interference areas $A_I$ may seem minor, the fact that any inference area exists violates the FCC framework for an AFC device. Namely, that an unlicensed device or other licensed device is not to interfere with a licensed system 102 for a particular licensed frequency band 122. Therefore, when the traditional AFC system receives the proposed geofence 126 and determines that the proposed geofence 126 interferes with licensed systems 102a—b, the traditional AFC system will generate a response 150 that informs that AFC device 110 that it cannot operate in the proposed geofence 126 using the proposed operating parameters 124 for the particular licensed frequency band 122. As can be shown by this example, the expectation that the AFC device 110 determines its own geofence without information about the incumbent licensed system(s) 102 can make geofencing with a traditional AFC system difficult. For instance, the AFC device 110 may wind up iterating its proposed geofence 126 several times until no interference areas $A_I$ exist.

In contrast to the traditional AFC system, FIG. 1B depicts an AFC system 200 that does not receive a proposed geofence 126 from the AFC device 110, but rather the AFC system 200 generates a geofence 152 for the AFC device 110 based on the target operating parameters 124 at the licensed frequency band 122. Although this AFC system 200 is still likely to have scenarios where no geofence exists for the AFC device 110 based on the operating parameter(s) 124 of the request 120 for the licensed frequency band 122, this approach likely reduces the number of times an AFC device 110 may receive a response 150 that does not approve at least some operating boundary for the AFC device 110. For instance, FIG. 1B compared to FIG. 1A illustrates that the AFC system 200 can just exclude the interference areas $A_I$ from the proposed geofence 126 of FIG. 1A to generate a geofence 152 that closely resembles the proposed geofence 126 of FIG. 1A. Here, the comparison between these figures illustrates how the AFC system 200 does not produce a geofence with some degree of interference because the AFC system 200 approaches the generation of the geofence 152 from another perspective where the geofence 152 is drawn with knowledge of operating areas $A_O$ for incumbent licensed system(s) 102.

As shown in FIGS. 1A and 1B, either AFC system may be in communication with a remote system 140 (e.g., a cloud-based AFC system). The remote system 140 includes remote computing resources 142 such as remote data processing hardware 144 (e.g., remote servers or CPUs) and remote memory hardware 146 (e.g., remote databases or other storage hardware). The AFC system 200 may utilize these remote computing resources 142 to perform various functionality related to geofence generation and/or to incumbent licensed system(s) analysis. For instance, in FIGS. 2A-2C, the AFC system 200 is shown to include a licensed system database 210 (i.e., a database of registered systems that have a license to use the licensed frequency band 122). The licensed system database 210 may be hosted on the remote system 140 (e.g., in a remote server) and accessible to the AFC system 200. Here, when the AFC system 200 receives the request 120, the AFC system 200 would access the licensed system database 210 on the remote system 140 to identify incumbent licensed systems 102 that may interfere with given the operating parameters 124 of the request 120. The AFC system 200 may reside on the AFC device 110 (referred to as an on-device system) or reside remotely (e.g., reside on the remote system 140), but in communication with the device 110. In some examples, portions of the AFC system 200 reside locally or on-device while others reside remotely.

Figure 2A:
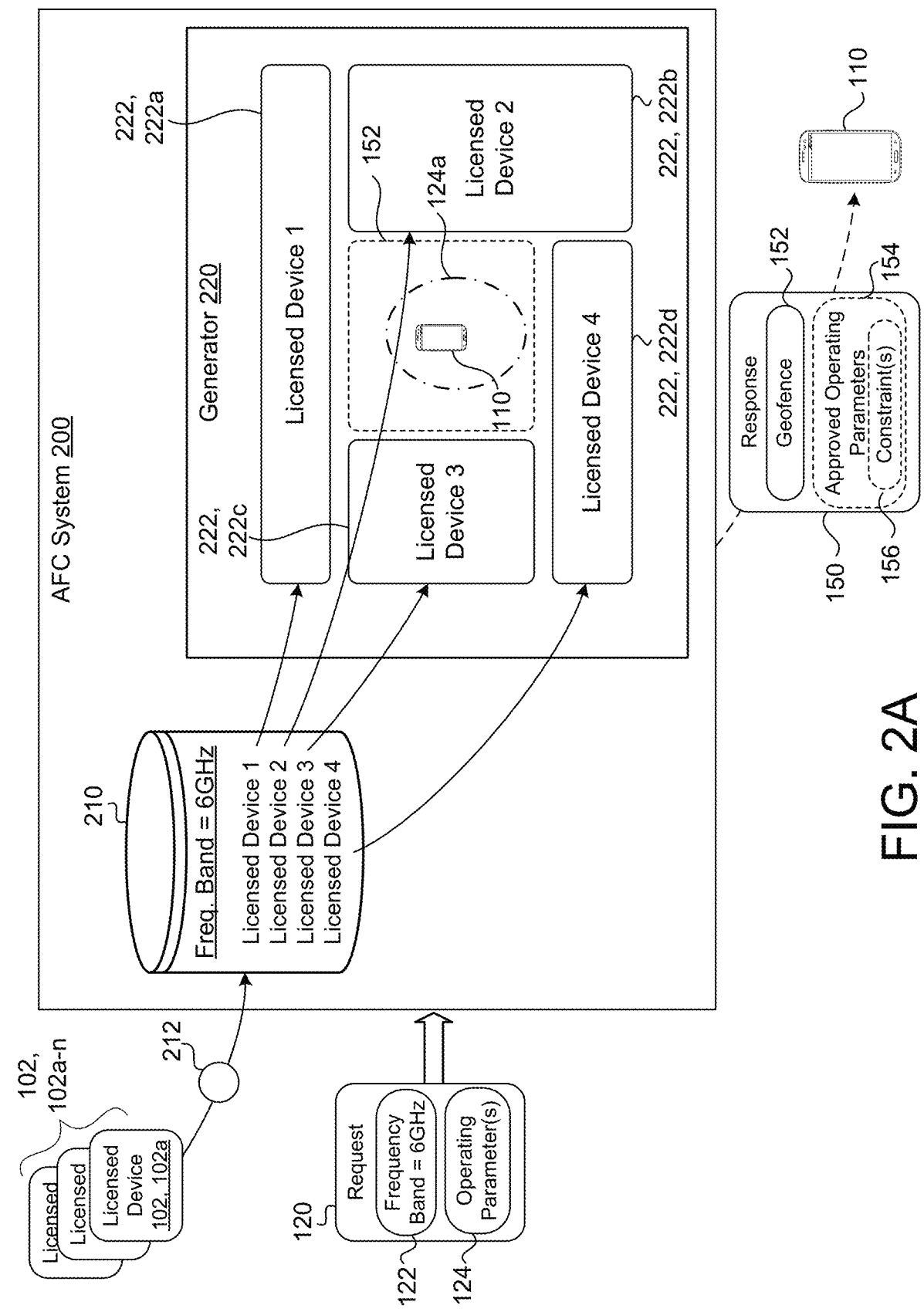
FIGS. 2A-2C are schematic views of example AFC systems.
Figure 2B:
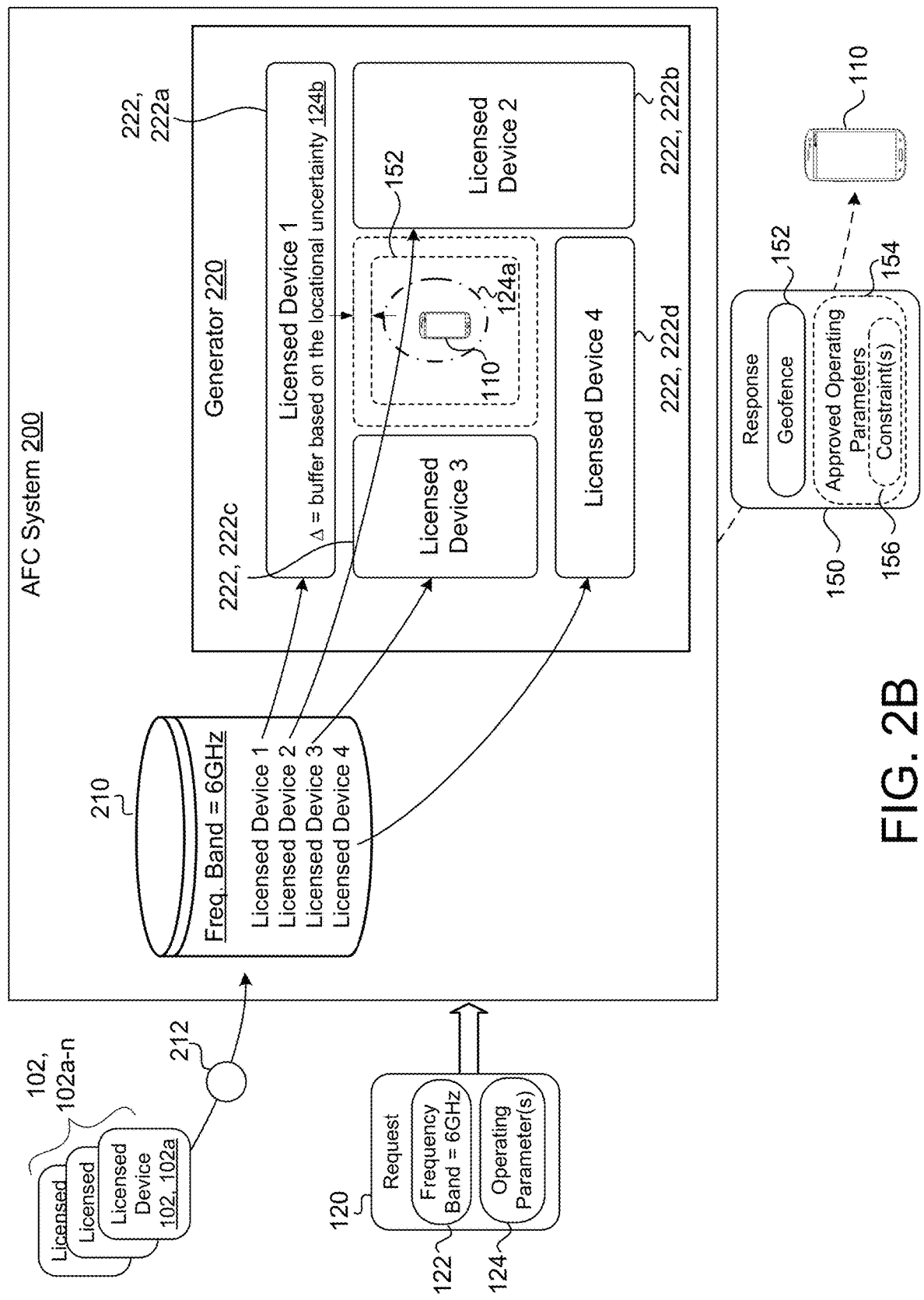
Figure 2C:
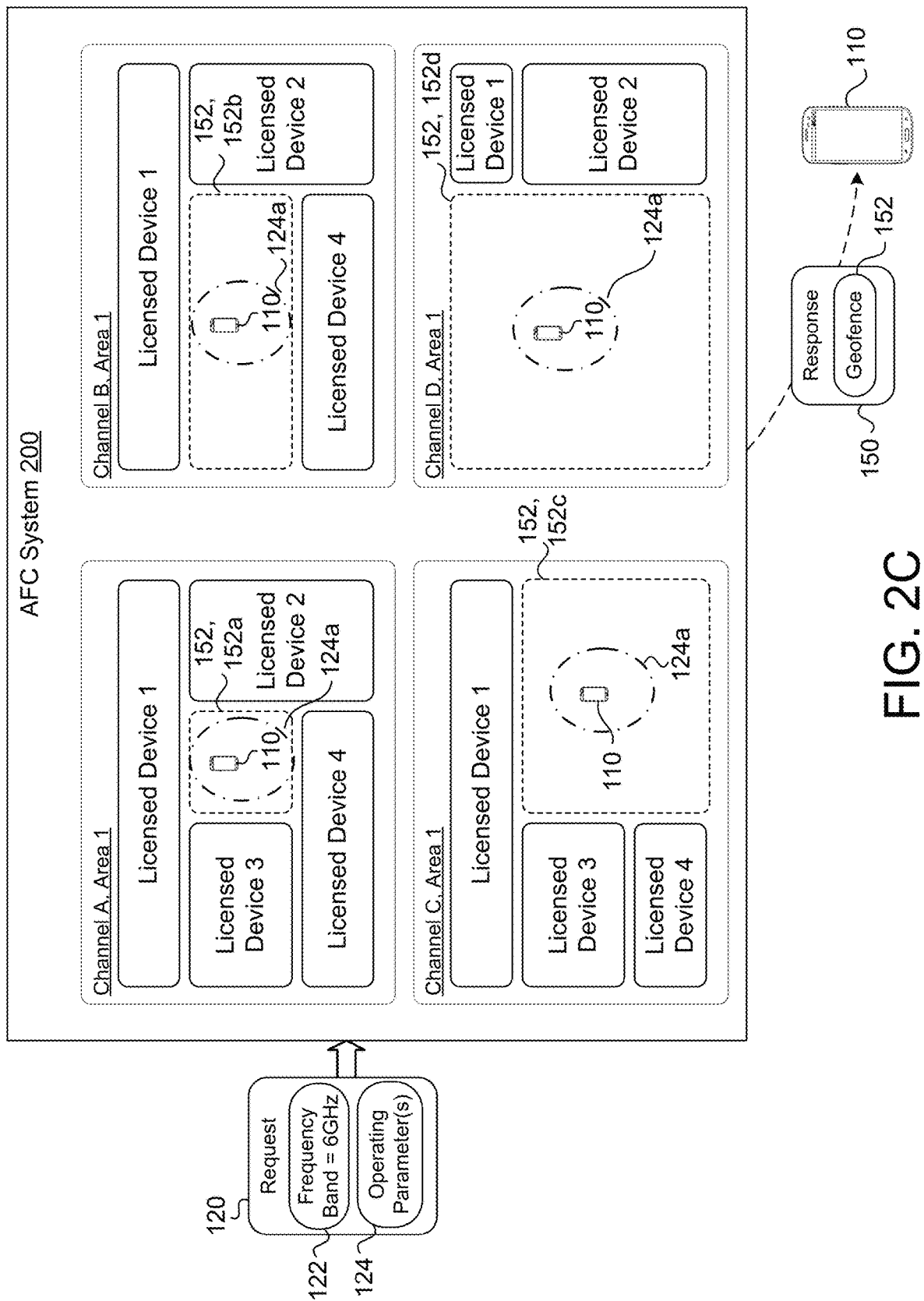

Referring to FIGS. 2A-2C, the AFC system 200 is configured to receive the request 120 from the AFC device 110 and to determine whether any of the one or more operating parameters 124 interfere with any licensed system 102 on the licensed radio frequency band 122. Here, when none of the one or more operating parameters 124 interferes with any of the licensed systems 102 on the licensed frequency band 122, the AFC system 200 generates a geofence 152 that defines an operating boundary for the AFC device 110 to operate within based on the one or more operating parameters 124. The AFC system 200 then communicates a response 150 to the request 120 from the AFC device 200 that includes the geofence 152 generated by the AFC system 200. In some implementations, in order to perform geofence generation, the AFC system 200 includes a licensed systems database 210 (also referred to as database 210) and a geofence generator 220 (also referred to as a generator 220).

To determine whether any of the operating parameters 124 interfere with any of the licensed systems 102 on the licensed frequency band 122, the AFC system 200 references the licensed systems database 210 (also referred to as database 210). The database 210 refers to a register for licensed systems 102 that includes information 212 about each licensed system 102 that has received a license for use on the licensed frequency band 122. For instance, when a licensed system 102 requests a license for a particular use on the licensed frequency band 122, the request for the license may include information 212 that defines how the requesting system intends to operate. In other words, due to the licensing process and/or information known/shared about a licensed system 102, the database 210 includes the operating parameter(s) for each licensed system 102 as part of its information 212. These operating parameters for a given licensed system 102 may include a location, a height (i.e., altitude above ground level), antenna characteristics, frequency of operation, and other operating parameters disclosed or identifiable about the operation of the licensed system 102.

With the requested operating parameters 124 from the AFC device 110 (e.g., from the request 120) and the current operating parameters included in the information 212 for each licensed system 102, the generator 220 of the AFC system 200 is configured to compare the requested operating parameters 124 against the current operating parameters (of the existing licensed systems 102) for potential interference. In some examples, the generator 220 identifies a location 124, 124a of the AFC device 110 from the operation parameters 124 of the request 120 and determines interference locations 222 in an area adjacent to the location 124a of the AFC device 110. Here, the interference locations 222 refer to a respective location where the operating parameters 124 of the request 120 would interfere with an operation of a licensed system 102 on the licensed frequency band 122. In some examples, the interference locations 222 refer to an outer boundary of a licensed system's operating area $A_O$. In other words, the boundaries of the licensed systems 102 inform the generator 220 that the AFC device 110 cannot be given a geofence 152 that crosses these boundaries and enters into an operating area $A_O$ of a licensed system 102. Otherwise, interference will result. With this approach, if the generator 220 determines the boundaries for the operating areas $A_O$ of licensed systems 102 in an area adjacent the location 124a of the AFC device 110, the generator 220 can configure, for example, a maximum sized geofence 152 by defining the geofence boundary up to, but not including the boundaries of one or more licensed systems 102 nearby the location 124a of the AFC device 110. In some implementations, the generator 220 may offset the geofence 152 from the boundary of an operating area $A_O$ for a licensed device 102 by some designated tolerance (i.e., functioning as a buffer) to ensure that the geofence 152 does not interfere with a licensed device 102. This offset process may then be repeated for all licensed systems 102 in the area adjacent to the location 124a of the AFC device 110 to generate the final geofence 152 communicated to the AFC device 110 with the response 150.

In some configurations, an interference location 222 refers to an intersection of the operating area $A_O$ for one or more licensed systems 102 and an operating area $A_O$ for the AFC device 110 based on the operating parameters 124 of the request 120. In addition to determining a boundary of an operating area $A_O$ for a licensed system 102, the generator 220 also may determine a theoretical operating area $A_O$ for the AFC device 110 using the operating parameters 124. In this sense, if the theoretical operating area $A_O$ for the AFC device 110 has some overlap (i.e., interference) with an operating area $A_O$ for a licensed system 102, the generator 220 may adjust the operating parameters 124 and recommend a geofence 152 with operating parameters (i.e., adjusted operating parameters) that deviate from the operating parameters 124 of the request 120. In some examples, the operating parameters 124 are one or more parameters with a potential range (e.g., a range of sufficient heights, a range of sufficient power levels, and/or multiple potential operating channels) and the generator 220 generates a geofence 152 for the AFC device 110 with adjusted operating parameters that still satisfy the range(s) for the operating parameter(s) 124 submitted with the request 120. Here, if the generator 220 generates a geofence 152 that fails to satisfy one or more submitted ranges of the operating parameters 124, the generator 220 may nonetheless communicate this geofence 152 to the AFC device 110, but indicate in some manner that the geofence 152 includes operating parameters permitted by the AFC system 200 that fail to satisfy the requested operating parameters 124.

In some implementations, such as FIGS. 2A and 2B, the generator 220 identifies the location 124a of the AFC device 110. Using this location 124a, the generator 220 searches the database 210 to determine if any licensed systems 102 are located in an area nearby the location 124a of the AFC device 110. In some examples, the generator 220 is configured to search a particular area centered on the location 124a of the AFC device 110 (e.g., a one mile square area). This search area may be a design parameter of the generator 220 (or AFC system 200) that is configured by an administrator of the AFC system 200. In some examples, the AFC device 110 may designate the search area as one of the operating parameters 124 of the request 120. Here, if the AFC device 110 does not specify a particular search area as an operating parameter 124, the AFC system 200 may be configured to use a default search area (e.g., 5 square miles). Based on the search area, the generator 220 in FIGS. 2A and 2B identifies four licensed systems 102, 102a-d in the vicinity of the location 124a of the AFC device 110. For each of the identified licensed systems 102 in the vicinity of the location 124a of the AFC device 110, the generator 220 analyzes the operating parameters from information 212 corresponding to a licensed system 102 to determine an interference location 222 for each identified licensed system 102. In FIGS. 2A and 2B, the generator 220 generates four interference locations 222, 222a-d corresponding to the boundaries of the operating areas $A_O$ for each of the four licensed systems 102a-d nearby the AFC device 110. With the interference locations 222 around the AFC device 110 defined, in some configurations, the generator 220 generates the operating boundary of the geofence 152 for the AFC device 110 by excluding the interference locations 222 from the operating boundary. In this respect, the exclusion results in the geofence 152 without areas that cause interference between the AFC device 110 and one or more nearby licensed systems 102 (e.g., the four licensed systems 102a-d).

In some configurations, the location 124a of the AFC device 110 includes a locational uncertainty 124, 124b (e.g., as another operating parameter 124) that communicates a likelihood that the AFC device 110 is in that particular location 124a. When the generator 220 receives a locational uncertainty 124b, the generator 220 may generate the geofence 152 based on the locational uncertainty 124b for the AFC device 110. In these configurations, the generator 220 identifies the locational uncertainty 124b when generating the geofence 152. For example, the generator 220 may use the locational uncertainty 124b to define the buffer (e.g., shown as A in FIG. 2B) for the geofence 152. Here, the buffer may refer to an area between one or more interference locations 222 (e.g., the boundary of an operating area $A_O$ for a licensed system 102) and the geofence 152. That is, the greater the locational uncertainty 124b, the greater the buffer area should be between the interference locations 222 and the operational boundary of the geofence 152. In other words, if the locational uncertainty 124b indicates that the location 124a for the AFC device 110 is not very certain, the generator 220 may ensure that the geofence 152 does not interfere with a licensed system 102 by creating a larger buffer (e.g., between an interference location 222 and the final geofence 152) and thus a smaller geofence 152.

In some examples, the operating parameters 124 define the location 124a of the AFC device 110 according to a longitude and latitude (also referred to as a horizontal location). Here, the location 124a may correspond to global positioning system (GPS) data for the AFC device 110. In other words, the AFC device 110 communicates with GPS to receive its coordinates and may pass these coordinates as an operating parameter 124 to the AFC system 200 in the request 120. In addition to the horizontal location for the AFC device 110, the operating parameters 124 may also include a height in the request 120. Here, the height may be expressed as a height/altitude above sea level (i.e., an elevation) in order to be consistent with a reference plane (i.e., sea level). By including a height in addition to the horizontal location (e.g., the longitude and latitude), the AFC system 200 receives a three-dimensional or volumetric operating request 120. In this respect, the AFC system 200 then functions to generate a volumetric geofence 152 based on the three-dimensional inputs (i.e., three-dimensional operating parameters 124). When the request 120 includes a height for the AFC device 110, this height may be a single height or a target range of heights. For instance, the AFC device 110 desires to operate somewhere in a range of heights between 640 feet above sea level and 800 feet above sea level. When the request 120 is a volumetric request, the generator 220 instead generates, for example, three-dimensional interference locations 222 rather than two-dimensional interference locations 222. In some implementations, the generator 220 generates a three dimensional geofence 152 when the input is a target range of heights by dividing that range of heights into discrete bands of heights and searching the discrete bands for interference. Referring further to the example of a range of heights between 640 feet above sea and 800 feet above sea level, the AFC system 200 may generate a geofence 152 spanning a range of heights from 700-730 feet above sea level; therefore, indicating that heights ranging from 640-699 feet above sea level and 731-800 feet above sea level are not available for the particular set of operating parameters 124 in the request 120.

The operating parameters 124 of the request 120 may also include a parameter relating to a power for the AFC device 110. For instance, the AFC device 110 includes an operating parameter 124 that designates a minimum operational power for the AFC device 110. That is, the AFC device 110 signals that the geofence 152 of the response 150 cannot require that the AFC device 110 operates at a power less than the minimum operational power. In this example, if the AFC system 200 could not generate a geofence 152 that meets the minimum operational power requirements, the AFC system 200 is configured to indicate that a geofence 152 is not available that satisfies the minimum operational power. In some examples, the operating parameters 124 include a range of acceptable power levels for the AFC device 110. In this example, the response 150 may include not only a geofence 152 for the AFC device 110, but also an acceptable range of power levels that the AFC device 110 can use to operate while located within the geofence 152.

The response 150 generally includes a geofence 152 with approved operating parameters 154 for the AFC device 110. These approved operating parameters 154 of the response 150 are "approved" parameters since the AFC system approves these parameters as parameters that the AFC device 110 can operate at while within the geofence 152. In other words, if an AFC device 110 operates according to operating parameters other than the approved operating parameters 154, the AFC device 110 may be in violation of the FCC framework (i.e., at risk of causing interference with licensed systems 102). In some examples, these approved operating parameters 154 include one or more constraints 156 that dictate absolute conditions for operation of the AFC device 110. Constraints 156 may be advantageous because, during operating of the AFC device 110, there may be a reason that the AFC device 110 may deviate from its operating parameters. By communicating constraints 156, the AFC device 110 can determine whether its deviation would cause interference with licensed system(s) 102 without having to reinitiate communication with the AFC system 200. In other words, the AFC device 110 determines whether a particular modification to an operating parameter fails to satisfy a relevant constraint 156.

One such example of a constraint 156 is a power constraint 156 for the geofence 152. Here, a power constraint 156 refers to a threshold operating power (e.g., maximum operating power) for the AFC device 110 to operate at while located within the geofence 152. That is, if the AFC device 110 operates at a power that exceeds the threshold of the power constraint 156, the AFC device 110 risks interfering with one or more licensed systems 102. Therefore, in some configurations, based on the power constraint 156, the AFC device 110 is only permitted to operate at a power equal to or less than the power constraint 156 while located in the geofence 152. In some implementations, if the power constraint 156 is less than the minimum operational power designated by the AFC device 110 in the operating parameters 124, the AFC system 200 does not include a geofence 152 with the response 150 and instead conveys that the minimum operational power cannot be satisfied. In this respect, when the operating parameters 124 cannot be met by the AFC system 200, the AFC system 200 may either fail to return a response 150 to a request 120, return a response 150 that indicates a rationale as to why the AFC system 200 cannot generate a geofence 152, or return a response 150 that proposes alternative operating parameters for a particular geofence 152. In the later case, when the AFC system 200 returns a response 150 that proposes alternative operating parameters for a particular geofence 152, the AFC system 200 may be configured with a deviation threshold that defines how much the AFC system 200 is permitted to deviate from the submitted/requested operating parameters 124.

Referring to FIG. 2C, the response 150 may include more than one geofence 152 (e.g., shown as four geofences 152, 152a-d). Here, each geofence 152 returned to the AFC device 110 as part of the response 150 is a permitted geofence 152 (also referred to as a recommended geofence) for the AFC device 110. In this sense, when the response 150 includes multiple geofences 152, each geofence 152 represents a geofence option for the AFC device 110. In some examples, the AFC device 110 receives more than one geofence 152 as optional operational boundaries for the AFC device 110 when the AFC device 110 submits operating parameters 124 that may be combined in different permutations by the AFC system 200 to generate more than one geofence 152. For instance, one more common scenario where this may occur is when the AFC device 110 communicates in the request 120 that it is capable of operating on more than one channel or range of frequencies within the licensed frequency band 122. In this situation, the AFC system 200 is configured to generate a geofence 152 for each potential channel or range of frequencies. To illustrate, FIG. 2C depicts that the AFC system 200 generates a geofence 152 for each potential channel where some area or volume adjacent the AFC device 110 exists that would not interfere with a licensed system 102. Here, the AFC system 200 generates four geofences 152a-d for four channels in the licensed frequency band 122 where each geofence 152 corresponds to one of the four channels. As can be seen from this example, one or more licensed systems 102 may be operating in different ways (e.g., with different operating areas $A_O$) on different channels. For instance, licensed system 2 does not operate on Channel B in the designated area (shown as Area 1) which results in a second geofence 152b that is larger on Channel B for the AFC device 110 compared to a first geofence 152a on Channel A where all licensed systems 102 are operating to some degree. Similarly, on Channel C, licensed system 2 does not operate and licensed system 4 operates in a smaller operating area $A_O$ (e.g., when compared to its operating area $A_O$ of Channel A or B). This results in a third geofence 152c that is different from the first geofence 152a of Channel A and the second geofence 152b of Channel C (e.g., spans a different portion of Area 1). On Channel D, licensed system 3 and 4 do not operate and licensed system 1 is operating in a smaller operating area $A_O$ (e.g., when compared to its operating area $A_O$ of Channels A, B, and C). This results in a fourth geofence 152d that is different yet from the other geofences 152a-c and spans almost $\frac{2}{3}^{rd}$ of the Area 1. Although FIG. 2C depicts geofences 152 for discrete channels (e.g., channels A–D), the AFC system 200 can also generate different geofences 152 for different ranges of frequencies (e.g., within a single channel or among multiple channels). For instance, a channel may include the frequencies of 5800 MHz to 6400 MHz and the AFC system 200 outputs two geofences 152, a first geofence 152 that can operate on the range of frequencies of 5925-6125 MHz and a second geofence 152 that can operate on the range of frequencies of 5925-6025 MHz. In this example, the first geofence 152 may be a one kilometer area centered around the AFC device 110 while the second geofence 152 may be a two kilometer area centered around the AFC device 110.

Returning to the example of FIG. 2C, with the generator 220 generating these geofences 152a-d for each Channel A-D, the AFC device 110 can then select which geofence 152 it prefers to operate on. For instance, the AFC device 110 may choose to operate on Channel C because the AFC device 110 prefers to operate more Easterly than the other geofences 152a-c. In some implementations, when there are multiple geofences 152 possible, the AFC system 200 is configured to suggest a geofence 152 that the AFC system 200 believes is most optimal (e.g., based on optimization criteria). For instance, this approach may minimize a potential selection burden for the AFC device 110. That is, some consumers may not feel as though they possess the knowledge to make a geofence selection and may prefer that the AFC system 200 identifies an optimal geofence 152. One such example of the optimization criteria may be that the AFC system 200 determines the geofence 152 with the greatest area or volume and the response 150 reflects that this geofence 152 with the greatest area or volume is the leading recommendation by the AFC system 200. In some configurations, when the AFC system 200 generates multiple geofences 152, the AFC device 110 may be configured to select an alternative geofence 152 that is different from the recommendation set forth by the AFC system 200.

Figure 3:
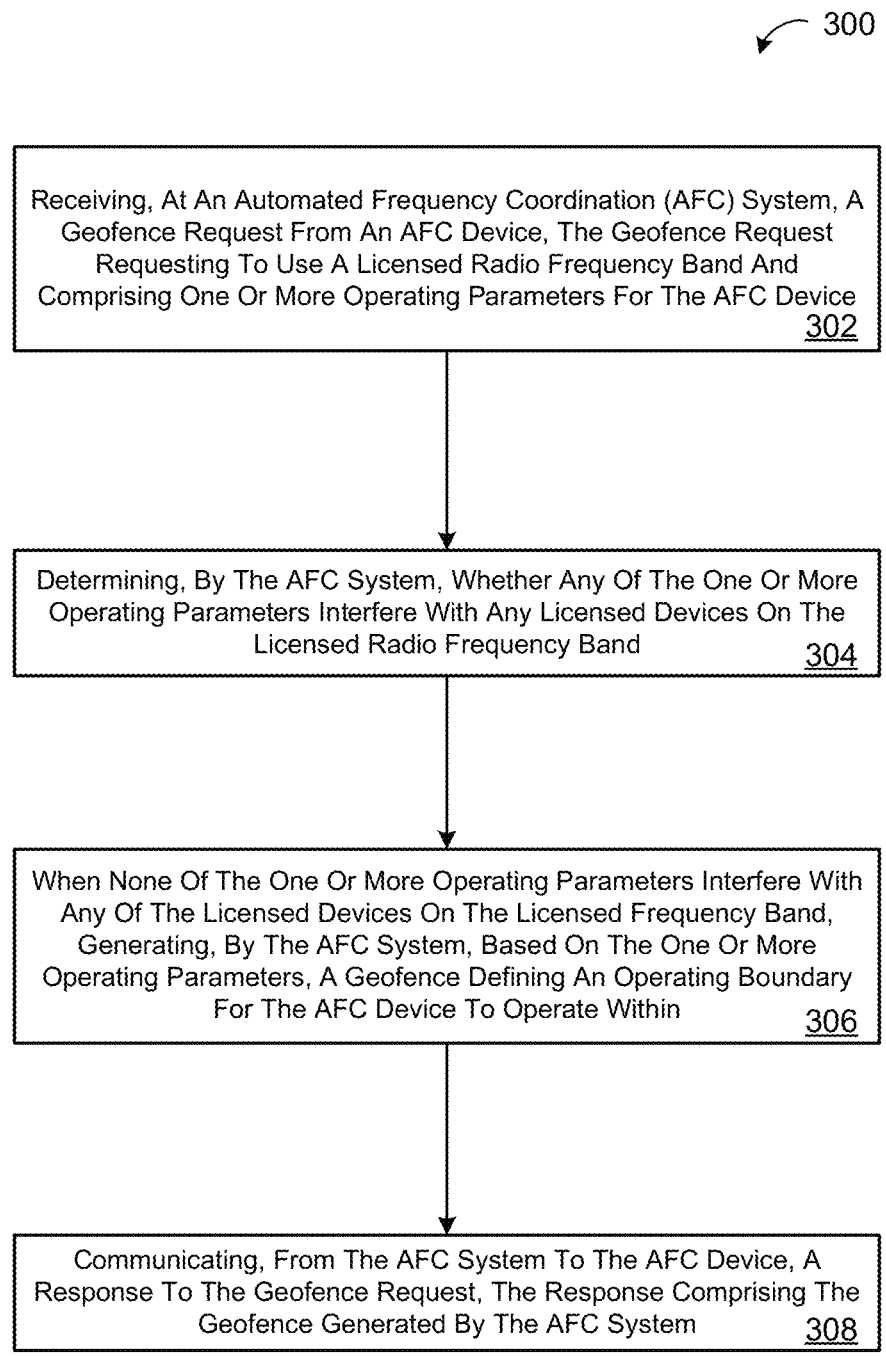
FIG. 3 is a flow chart of an example arrangement of operations for a method of generating a geofence for an AFC device using an AFC system.

FIG. 3 is a flowchart of an example arrangement of operations for a method 300 of generating a geofence 152 for the AFC device 110 using the AFC system 200. At operation 302, the method 300 receives a geofence request 120 from an AFC device 110. The geofence request 120 requests to use a licensed radio frequency band 122 and includes one or more operating parameters 124 for the AFC device 110. At operation 304, the method 300 determines whether any of the one or more operating parameters 124 interfere with any licensed devices 102 on the licensed radio frequency band 122. When none of the one or more operating parameters 124 interfere with any of the licensed devices 102 on the licensed frequency band 122, at operation 306, the method 300 generates, based on the one or more operating parameters 124, a geofence 152 defining an operating boundary for the AFC device 110 to operate within. At operation 308, the method 300 communicates a response 150 to the geofence request 120 to the AFC device 110 where the response 150 includes the geofence 152.

Figure 4:
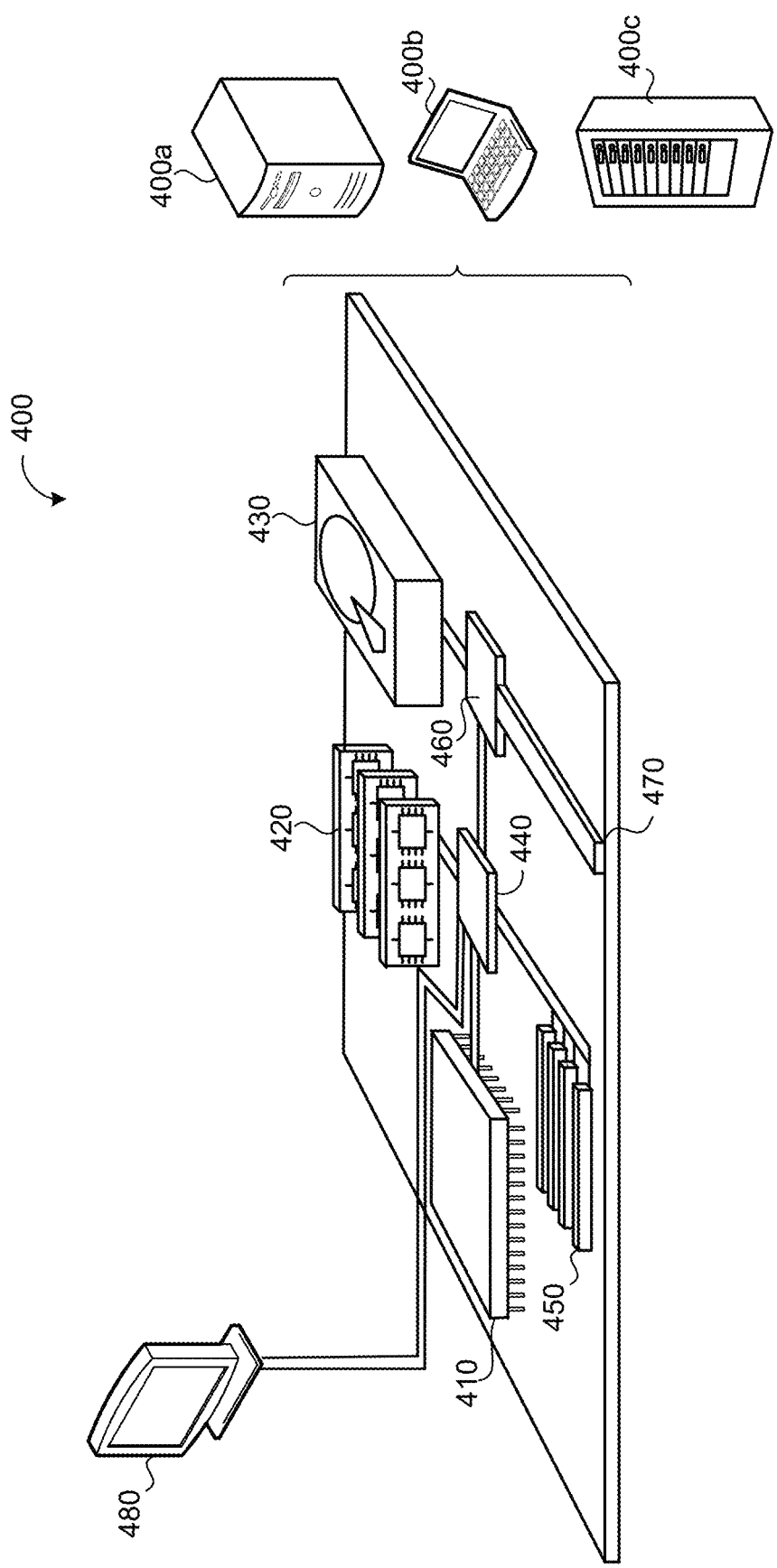
FIG. 4 is a schematic view of an example computing device that may be used to implement the systems and methods described herein.

FIG. 4 is a schematic view of an example computing device 400 that may be used to implement the systems (e.g., the AFC system 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., the data processing hardware 112, 144), memory 420 (e.g., the memory hardware 114, 146), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, at an automated frequency coordination (AFC) system, a geofence request from a mobile AFC device, the geofence request requesting to use a licensed radio frequency band and comprising one or more operating parameters for the AFC device;
   determining, by the AFC system, whether any of the one or more operating parameters interfere with any licensed devices on the licensed radio frequency band;
   when none of the one or more operating parameters interfere with any of the licensed devices on the licensed radio frequency band, generating, by the AFC system, based on the one or more operating parameters, a geofence defining an operating boundary of a geographic area within which the AFC device may move while communicating using the licensed radio frequency band; and
   communicating, from the AFC system to the AFC device, a response to the geofence request, the response comprising the geofence generated by the AFC system.

2. The method of claim 1, wherein:
   the operations further comprise identifying, by the AFC system, a locational uncertainty for the AFC device; and
   generating the geofence defining the operating boundary of the geographic area is further based on the location uncertainty of the AFC device.

3. The method of claim 1, wherein:
   the operations further comprise:
      identifying, from the one or more operating parameters, a location of the AFC device; and
      determining interference locations in an area adjacent to the location identified for the AFC device, each interference location corresponding to a respective location where the one or more operating parameters interfere with a licensed device on the licensed radio frequency band; and
   generating the geofence defining the operating boundary of the geographic area is further based on excluding the interference locations from the operating boundary.

4. The method of claim 1, wherein the one or more operating parameters comprise a location for the AFC device.

5. The method of claim 1, wherein:
   the one or more operating parameters comprise a longitude, a latitude, and a height above ground level for the AFC device; and
   the operating boundary of the geofence corresponds to a volumetric space within which the AFC device may move while communicating using the licensed radio frequency band based on the one or more operating parameters.

6. The method of claim 1, wherein the response further comprises an operating power constraint for the AFC device, the operating power constraint indicating a threshold operating power for the AFC device to operate at within the geofence generated by the AFC system.

7. The method of claim 1, wherein the response further comprises a plurality of recommended geofences, the plurality of recommended geofences comprising:
   the geofence and a first range of frequencies in the licensed radio frequency band for the AFC device to communicate within the geofence; and
   a second geofence and a second range of frequencies in the licensed radio frequency band for the AFC device to communicate within the second geofence, the second geofence defining a different respective operating boundary than the operating boundary of the geofence.

8. The method of claim 1, wherein the one or more operating parameters comprise a minimum operating power for the AFC device.

9. The method of claim 1, wherein the one or more operating parameters comprises global positioning system (GPS) information for the AFC device.

10. The method of claim 1, wherein the AFC device is a device without a license to operate at the licensed radio frequency band.

11. A system comprising:
    data processing hardware; and
    memory hardware in communication with the data processing hardware, the memory hardware storing instructions that when executed on the data processing hardware cause the data processing hardware to perform operations comprising:
       receiving, at an automated frequency coordination (AFC) system, a geofence request from a mobile AFC device, the geofence request requesting to use a licensed radio frequency band and comprising one or more operating parameters for the AFC device;
       determining, by the AFC system, whether any of the one or more operating parameters interfere with any licensed devices on the licensed radio frequency band;
       when none of the one or more operating parameters interfere with any of the licensed devices on the licensed radio frequency band, generating, by the AFC system, based on the one or more operating parameters, a geofence defining an operating boundary of a geographic area within which the AFC device may move while communicating using the licensed radio frequency band; and
       communicating, from the AFC system to the AFC device, a response to the geofence request, the response comprising the geofence generated by the AFC system.

12. The system of claim 11, wherein:
    the operations further comprise identifying, by the AFC system, a locational uncertainty for the AFC device; and
    generating the geofence defining the operating boundary of the geographic area is further based on the location uncertainty of the AFC device.

13. The system of claim 11, wherein:
    the operations further comprise:
       identifying, from the one or more operating parameters, a location of the AFC device; and
       determining interference locations in an area adjacent to the location identified for the AFC device, each interference location corresponding to a respective location where the one or more operating parameters interfere with a licensed device on the licensed radio frequency band; and generating the geofence defining the operating boundary of the geographic area is further based on excluding the interference locations from the operating boundary.

14. The system of claim 11, wherein the one or more operating parameters comprise a location for the AFC device.

15. The system of claim 11, wherein:
the one or more operating parameters comprise a longitude, a latitude, and a height above ground level for the AFC device; and
the operating boundary of the geofence corresponds to a volumetric space within which the AFC device may move while communicating using the licensed radio frequency band based on the one or more operating parameters.

16. The system of claim 11, wherein the response further comprises an operating power constraint for the AFC device, the operating power constraint indicating a threshold operating power for the AFC device to operate at within the geofence generated by the AFC system.

17. The system of claim 11, wherein the response further comprises a plurality of recommended geofences, the plurality of recommended geofences comprising:
the geofence and a first range of frequencies in the licensed radio frequency band for the AFC device to communicate within the geofence; and
a second geofence and a second range of frequencies in the licensed radio frequency band for the AFC device to communicate within the second geofence, the second geofence defining a different respective operating boundary than the operating boundary of the geofence.

18. The system of claim 11, wherein the one or more operating parameters comprise a minimum operating power for the AFC device.

19. The system of claim 11, wherein the one or more operating parameters comprises global positioning system (GPS) information for the AFC device.

20. The system of claim 11, wherein the AFC device is a device without a license to operate at the licensed radio frequency band.

* * * * *